US010600049B2

(12) United States Patent
Qian et al.

(10) Patent No.: US 10,600,049 B2
(45) Date of Patent: Mar. 24, 2020

(54) DIGITAL WALLET-BASED TRANSACTION METHOD, APPARATUS, AND SYSTEM

(71) Applicant: Huawei Technologies Co., Ltd., Shenzhen (CN)

(72) Inventors: Li Qian, Shenzhen (CN); Hao Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 15/188,004

(22) Filed: Jun. 21, 2016

(65) Prior Publication Data

US 2016/0300221 A1 Oct. 13, 2016

Related U.S. Application Data

(63) Continuation of application No. PCT/CN2014/094072, filed on Dec. 17, 2014.

(30) Foreign Application Priority Data

Dec. 23, 2013 (CN) .......................... 2013 1 0719447

(51) Int. Cl.
*G06Q 20/36* (2012.01)
*G06Q 20/22* (2012.01)
(Continued)

(52) U.S. Cl.
CPC ........... *G06Q 20/367* (2013.01); *G06Q 20/10* (2013.01); *G06Q 20/102* (2013.01); *G06Q 20/22* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 7,318,049 B2 * 1/2008 Iannacci ................ G06Q 20/10
705/39
8,311,913 B2 * 11/2012 Marchetti .......... G06Q 20/3572
705/35
(Continued)

FOREIGN PATENT DOCUMENTS

CN 1559046 A 12/2004
CN 1704956 A 12/2005
(Continued)

OTHER PUBLICATIONS

Burstein, et al. "Support for real-time decision making in mobile financial applications", Inf Syst E-Bus Manage(2008) 6:257-278, DOI 10.1007/s10257-008-0090-4. (Year: 2008).*
(Continued)

*Primary Examiner* — Frantzy Poinvil
(74) *Attorney, Agent, or Firm* — Conley Rose, P.C.

(57) ABSTRACT

The present disclosure discloses a digital wallet-based transaction method. The method includes acquiring sales information of a target object, acquiring at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and displaying the acquired at least one payment solution. According to the present disclosure, a payment solution is generated by crosswise combining multiple types of valid preference information of at least two target objects, thereby obtaining a payment solution that better meets a user demand, which gives full consideration to user benefits and has strong practicability.

27 Claims, 8 Drawing Sheets

(51) Int. Cl.
*G06Q 20/10* (2012.01)
*G06Q 30/02* (2012.01)

(52) U.S. Cl.
CPC ......... *G06Q 20/36* (2013.01); *G06Q 30/0207* (2013.01)

(58) Field of Classification Search
USPC ...................................................... 705/3–44
See application file for complete search history.

(56) References Cited

U.S. PATENT DOCUMENTS

| | | | |
|---|---|---|---|
| 8,930,270 B2* | 1/2015 | Roskind | G06Q 20/02 705/40 |
| 9,779,398 B2* | 10/2017 | Peterson | G06Q 20/352 |
| 2004/0188521 A1 | 9/2004 | Iijima | |
| 2007/0282741 A1* | 12/2007 | Kumar | G06Q 20/10 705/40 |
| 2008/0133407 A1* | 6/2008 | Guillory | G06Q 20/102 705/40 |
| 2008/0162371 A1* | 7/2008 | Rampell | G06Q 30/0207 705/80 |
| 2008/0163257 A1 | 7/2008 | Carlson et al. | |
| 2010/0125495 A1 | 5/2010 | Smith et al. | |
| 2011/0087592 A1* | 4/2011 | van der Veen | G06Q 20/12 705/44 |
| 2012/0166332 A1* | 6/2012 | Naaman | G06Q 20/102 705/40 |
| 2012/0310826 A1 | 12/2012 | Chatterjee et al. | |
| 2014/0207550 A1* | 7/2014 | Eden | G06Q 30/06 705/14.23 |
| 2014/0244481 A1* | 8/2014 | Onyenobi | G06Q 20/227 705/39 |
| 2014/0297381 A1 | 10/2014 | Park | |
| 2015/0052062 A1* | 2/2015 | Flomin | G06Q 30/0633 705/71 |
| 2015/0066620 A1* | 3/2015 | Roskind | G06Q 20/02 705/14.23 |
| 2015/0066670 A1* | 3/2015 | Wentker | G06Q 20/10 705/17 |
| 2016/0125512 A1* | 5/2016 | Napper | G06Q 10/06316 455/456.3 |
| 2016/0300221 A1* | 10/2016 | Qian | G06Q 20/22 |

FOREIGN PATENT DOCUMENTS

| | | |
|---|---|---|
| CN | 101647038 A | 2/2010 |
| CN | 102521747 A | 6/2012 |
| CN | 103246979 A | 8/2013 |
| WO | 2013012200 A3 | 3/2013 |

OTHER PUBLICATIONS

"Retailer Payment Systems: Relative Merits of Cash and Payment Cards" Economists Incorporated, Nov. 19 (Year: 2014).*
Machine Translation and Abstract of Chinese Publication No. CN103246979, Aug. 14, 2013, 7 pages.
Foreign Communication From a Counterpart Application, Chinese Application No. 201310719447.X, Chinese Office Action dated Aug. 28, 2017, 10 pages.
Partial English Translation and Abstract of Chinese Patent Application No. CN1704956, Dec. 7, 2005, 4 pages.
Foreign Communication From a Counterpart Application, PCT Application No. PCT/CN2014/094072, English Translation of International Search Report dated Mar. 3, 2015, 2 pages.
Foreign Communication From a Counterpart Application, PCT Application No. PCT/CN2014/094072, English Translation of Written Opinion dated Mar. 3, 2015, 7 pages.
Foreign Communication From a Counterpart Application, Chinese Application No. 201310719447.X, Chinese Office Action dated Dec. 11, 2018, 14 pages.

* cited by examiner

DIGITAL WALLET-BASED TRANSACTION METHOD, APPARATUS, AND SYSTEM

CROSS-REFERENCE TO RELATED APPLICATIONS

This application is a continuation of International Application No. PCT/CN2014/094072, filed on Dec. 17, 2014, which claims priority to Chinese Patent Application No. 201310719447.X, filed on Dec. 23, 2013, both of which are hereby incorporated by reference in their entireties.

TECHNICAL FIELD

The present disclosure relates to the field of e-commerce application technologies, and in particular, to a digital wallet-based transaction method, apparatus, and system.

BACKGROUND

With an increasing quantity of merchants participating in sales promotions, sales promotion means used by the merchants become increasingly abundant. For example, there are discount promotions (such as passing out coupons), card promotions (such as an annual card, a gold card, and a bonus point card), premium sales, rebate promotions, and the like. Passing out various coupons (such as a cash coupon, a special coupon, a redemption coupon, and a discount coupon) to customers is a relatively common sales promotion manner.

A transaction method is provided in the prior art, where in the method, a user may use preference information from different preference-offering parties. In one embodiment, the method includes receiving, by a point-of-sale terminal, a customer identifier (for example, an account associated with a payment card) and to-be-used preference information during a transaction, and sending the customer identifier and the preference information to a preference-offering party corresponding to the preference information, determining, by the preference-offering party, whether the preference information is valid, and returning the valid preference information to the point-of-sale terminal, and presenting, by the point-of-sale terminal to the user, a payment solution (including the valid preference information, a sum of money required using the preference, and the like) corresponding to the valid preference information, and receiving a payment solution selected by the user, so as to complete the transaction.

In a process of implementing the present disclosure, the inventor finds that the prior art has at least the following problems.

When a user uses preferences provided by multiple preference-offering parties and there are multiple types of valid preference information that are determined by the preference-offering parties, a point-of-sale terminal may display multiple payment solutions that are separately corresponding to the various types of valid preference information, however, a most preferential payment solution may not be in these payment solutions. As a result, the user may suffer an economic loss to some extent when these payment solutions are used.

SUMMARY

To resolve a problem in the prior art that a payment solution may not be a most preferential one, embodiments of the present disclosure provide a digital wallet-based transaction method, apparatus, and system. The technical solutions are as follows.

According to an aspect, an embodiment of the present disclosure provides a digital wallet-based transaction method, where the method includes acquiring sales information of a target object, acquiring at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and displaying the acquired at least one payment solution.

Further, the at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a very important person (VIP) card is preferred, a payment solution with a smallest payment amount under a condition in which a coupon is preferred, and a payment solution with a smallest payment amount under a condition in which bonus points are preferred.

Further, the acquiring at least one payment solution for the target object includes determining the valid preference information of the target objects, where the valid preference information includes single item preference information of each target object in the target objects and overall preference information of all target objects in the target objects, calculating a single-item actual payment amount after a preference is offered to each target object using the respective single item preference information, calculating, in a traversal manner, a total payment amount of the target objects using various combinations of the single-item actual payment amounts of the target objects, and generating a first payment solution, calculating a total payment amount of the target objects after a preference is offered to all the target objects using the overall preference information, and generating a second payment solution, and generating the at least one payment solution according to the first payment solution and the second payment solution.

Further, the valid preference information further includes partial preference information of some target objects in the target objects, the acquiring at least one payment solution for the target object further includes calculating a first actual payment amount of the some target objects after a preference is offered using the partial preference information, and calculating second actual payment amounts of the other target objects in the target objects except the some target objects after a preference is offered using respective single item preference information, and calculating, in a traversal manner, a total payment amount of the target objects using various combinations of the first actual payment amount and the second actual payment amounts, and generating a third payment solution, and the generating the at least one payment solution according to the first payment solution and the second payment solution includes generating the at least one payment solution according to the first payment solution, the second payment solution, and the third payment solution.

Further, the determining the valid preference information of the target objects includes acquiring information about the account in the digital wallet of the user, where the account includes one or more of a credit card account, a bank card account, a VIP card account, a bonus point account, and a coupon account, acquiring preference information corresponding to the account, and matching the preference information corresponding to the information about the account with the target objects, to obtain the valid preference information of the target objects.

In one embodiment, the acquiring at least one payment solution for the target object includes sending the sales information of the target object to a digital wallet server, and receiving the at least one payment solution returned by the digital wallet server, where when there are at least two target objects, the at least one payment solution is obtained by the digital wallet server by crosswise combining the multiple types of valid preference information of the at least two target objects.

In one embodiment, the displaying the acquired at least one payment solution includes receiving a payment solution setting instruction entered by the user, and displaying at least one payment solution including a payment solution corresponding to the payment solution setting instruction.

Further, the method further includes receiving a payment solution selection instruction entered by the user, and using a payment solution corresponding to the payment solution selection instruction to complete a transaction.

According to another aspect, an embodiment of the present disclosure provides a digital wallet-based transaction method, where the method includes receiving sales information, of a target object, sent by a digital wallet client, acquiring at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and sending the at least one payment solution to the digital wallet client.

Further, the at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

Further, the acquiring at least one payment solution for the target object includes determining the valid preference information of the target objects, where the valid preference information includes single item preference information of each target object in the target objects and overall preference information of all target objects in the target objects, calculating a single-item actual payment amount after a preference is offered to each target object using the respective single item preference information, calculating, in a traversal manner, a total payment amount of the target objects using various combinations of the single-item actual payment amounts of the target objects, and generating a first payment solution, calculating a total payment amount of the target objects after a preference is offered to all the target objects using the overall preference information, and generating a second payment solution, and generating the at least one payment solution according to the first payment solution and the second payment solution.

Further, the valid preference information further includes partial preference information of some target objects in the target objects; the acquiring at least one payment solution for the target object further includes calculating a first actual payment amount of the some target objects after a preference is offered using the partial preference information, and calculating second actual payment amounts of the other target objects in the target objects except the some target objects after a preference is offered using respective single item preference information, and calculating, in a traversal manner, a total payment amount of the target objects using various combinations of the first actual payment amount and the second actual payment amounts, and generating a third payment solution, and the generating the at least one payment solution according to the first payment solution and the second payment solution includes generating the at least one payment solution according to the first payment solution, the second payment solution, and the third payment solution.

Further, the determining the valid preference information of the target objects includes receiving information, about the account in the digital wallet of the user, sent by the digital wallet client, where the account includes one or more of a credit card account, a bank card account, a VIP card account, a bonus point account, and a coupon account, acquiring preference information corresponding to the account, and matching the preference information corresponding to the information about the account with the target objects, to obtain the valid preference information of the target objects.

According to another aspect, an embodiment of the present disclosure provides a digital wallet-based transaction apparatus, where the apparatus includes a first acquiring module configured to acquire sales information of a target object, a payment solution acquiring module configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a display module configured to display the acquired at least one payment solution.

Preferably, the at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

Further, the payment solution acquiring module includes a valid-preference determining unit configured to acquire the valid preference information of the target objects, where the valid preference information includes single item preference information of each target object in the target objects and overall preference information of all target objects in the target objects, a calculating unit configured to calculate a single-item actual payment amount after a preference is offered to each target object using the respective single item preference information, calculate, in a traversal manner, a total payment amount of the target objects using various combinations of the single-item actual payment amounts of the target objects, and generate a first payment solution, and configured to calculate a total payment amount of the target objects after a preference is offered to all the target objects using the overall preference information, and generate a second payment solution, and a generating unit configured to generate the at least one payment solution according to the first payment solution and the second payment solution.

Further, the valid preference information further includes partial preference information of some target objects in the target objects, the calculating unit is further configured to calculate a first actual payment amount of the some target objects after a preference is offered using the partial preference information, and calculate second actual payment amounts of the other target objects in the target objects except the some target objects after a preference is offered using respective single item preference information, and calculate, in a traversal manner, a total payment amount of the target objects using various combinations of the first actual payment amount and the second actual payment amounts, and generate a third payment solution, and the generating unit is configured to generate the at least one payment solution according to the first payment solution, the second payment solution, and the third payment solution.

Further, the valid-preference determining unit includes an account information acquiring subunit configured to acquire information about the account in the digital wallet of the user, where the account includes one or more of a credit card account, a bank card account, a VIP card account, a bonus point account, and a coupon account, a preference information acquiring subunit configured to acquire the preference information corresponding to the account, and a determining subunit configured to match the preference information corresponding to the information about the account with the target objects, to obtain the valid preference information of the target objects.

In one embodiment, the payment solution generating module further includes a sending unit configured to send the sales information of the target object to a digital wallet server, and a receiving unit configured to receive the at least one payment solution returned by the digital wallet server, where when there are at least two target objects, the at least one payment solution is obtained by the digital wallet server by crosswise combining the multiple types of valid preference information of the at least two target objects.

In one embodiment, the apparatus further includes a user interaction module configured to receive a payment solution setting instruction entered by the user, and the display module is further configured to display at least one payment solution including a payment solution corresponding to the payment solution setting instruction.

Further, the user interaction module is further configured to receive a payment determining instruction entered by the user, and the apparatus further includes a payment management module configured to use a payment solution corresponding to the payment solution selection instruction to complete a transaction.

According to another aspect, an embodiment of the present disclosure provides a digital wallet-based transaction apparatus, where the apparatus includes a receiving module configured to receive sales information, of a target object, sent by a digital wallet client, a payment solution acquiring module configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a sending module configured to send the at least one payment solution to the digital wallet client.

Further, the payment solution acquiring module includes a valid-preference determining unit configured to acquire the valid preference information of the target objects, where the valid preference information includes single item preference information of each target object in the target objects and overall preference information of all target objects in the target objects, a calculating unit configured to calculate a single-item actual payment amount after a preference is offered to each target object using the respective single item preference information, calculate, in a traversal manner, a total payment amount of the target objects using various combinations of the single-item actual payment amounts of the target objects, and generate a first payment solution, and configured to calculate a total payment amount of the target objects after a preference is offered to all the target objects using the overall preference information, and generate a second payment solution, and a generating unit configured to generate the at least one payment solution according to the first payment solution and the second payment solution.

Further, the valid preference information further includes partial preference information of some target objects in the target objects, the calculating unit is further configured to calculate a first actual payment amount of the some target objects after a preference is offered using the partial preference information, and calculate second actual payment amounts of the other target objects in the target objects except the some target objects after a preference is offered using respective single item preference information, and calculate, in a traversal manner, a total payment amount of the target objects using various combinations of the first actual payment amount and the second actual payment amounts, and generate a third payment solution, and the generating unit is configured to generate the at least one payment solution according to the first payment solution, the second payment solution, and the third payment solution.

Further, the valid-preference generating unit includes an account information acquiring subunit configured to receive information, about the account in the digital wallet of the user, sent by the digital wallet client, where the account includes one or more of a credit card account, a bank card account, a VIP card account, a bonus point account, and a coupon account, a preference information acquiring subunit configured to acquire preference information corresponding to the account, and a determining subunit configured to match the preference information corresponding to the information about the account with the target objects, to obtain the valid preference information of the target objects.

According to still another aspect, an embodiment of the present disclosure provides a digital wallet-based transaction system, where the system includes a digital wallet client and a digital wallet server, the digital wallet client is configured to acquire sales information of a target object, and send the sales information of the target object to the digital wallet server, the digital wallet server is configured to receive the sales information, of the target object, sent by the digital wallet client, acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and send the at least one payment solution to the digital wallet client, and the digital wallet client is further configured to receive the at least one payment solution and display the received at least one payment solution.

The technical solutions provided by the embodiments of the present disclosure bring about the following beneficial effects Sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

BRIEF DESCRIPTION OF DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

Figure 1:
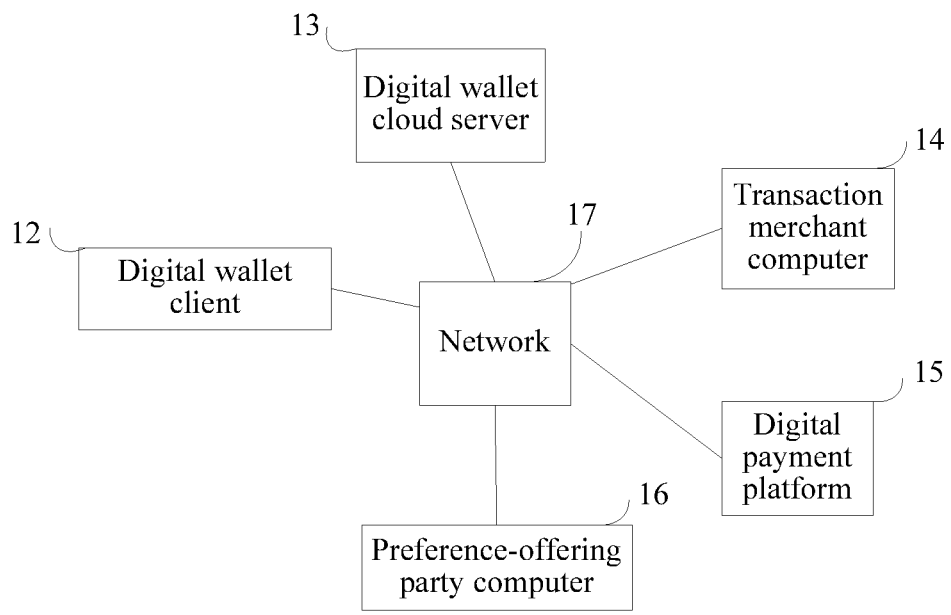
FIG. 1 is a schematic structural diagram of an application scenario according to an embodiment of the present disclosure.

To make the embodiments of the present disclosure more comprehensible, the following first describes an application scenario of the embodiments of the present disclosure with reference to FIG. 1. This system includes a digital wallet client 12, a digital wallet server 13, a transaction merchant computer 14, an digital payment platform 15, a preference-offering party computer 16, and a network 17. The digital wallet client 12, the digital wallet server 13, the transaction merchant computer 14, the electronic payment platform 15, and the preference-offering party computer 16 are all interconnected using the network 17.

A digital wallet is a payment tool commonly used by an online shopping customer in an e-commerce shopping activity. A digital wallet of a user may include information about multiple accounts, where the accounts include but are not limited to one or more deposit cards, one or more credit cards, and VIP cards, bonus point cards, and coupons that are issued by one or more merchants. All these accounts may be used to pay for a product or a service that the user wants to buy. The digital wallet may be disposed in the digital wallet client 12, the user of the digital wallet uses the digital wallet using the digital wallet client 12, and the digital wallet client 12 may be various terminal devices such as a mobile terminal or a personal computer.

The electronic payment platform 15 is an electronic transaction payment medium, for example, online banking or Alipay®, between the user of the digital wallet and the transaction merchant computer 14, and a preference-offering party may be an issuing bank, a Visa organization, a merchant, or the like. The network 17 may be a cellular network, such as, for example, Global System For Mobile Communication (GSM), Universal Mobile Telecommunications System (UMTS), Long Term Evolution (LTE), or Code Division Multiple Access (CDMA), a wireless local area network, or near-field communication, which is not limited in the embodiments of the present disclosure.

It should be noted that, the digital wallet server 13 may be used when the digital wallet client 12 works in a cloud-client collaboration mode (see Embodiment 3 and Embodiment 4).

Embodiment 1

Figure 2:
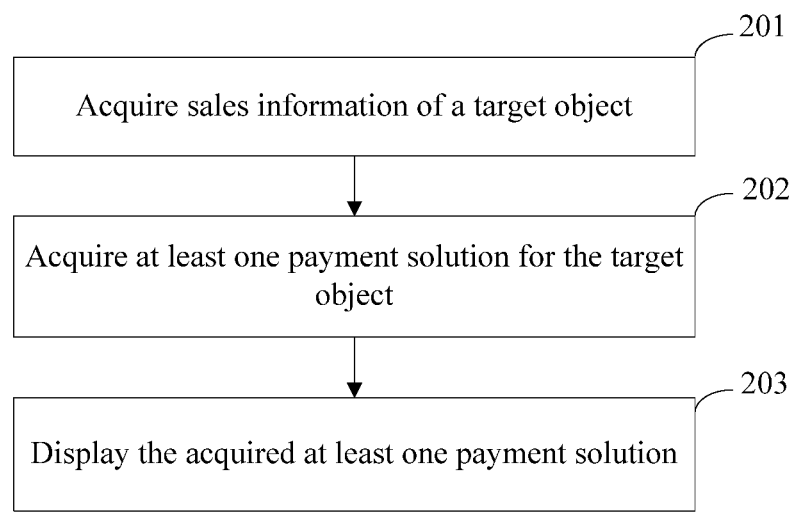
FIG. 2 is a schematic flowchart of a digital wallet-based transaction method according to Embodiment 1 of the present disclosure.

This embodiment of the present disclosure provides a digital wallet-based transaction method. The method is executed by the foregoing digital wallet client, where the digital wallet client may be used in a client local mode (see Embodiment 2) or a cloud-client collaboration mode (see Embodiment 4). Referring to FIG. 2, the method includes the following steps.

Step 201: Acquire sales information of a target object.

The target object includes but is not limited to a target product or service (for example, a product or a service that a user wants to buy). The sales information includes but is not limited to an identifier (for example, a code) or an original price of a product or a service, and the sales information may further include a name, a production place, and the like of a product or a service.

Step 202: Acquire at least one payment solution for the target object.

In one embodiment, when the digital wallet client is used in the client local mode, in step 202, the digital wallet client generates and acquires the payment solution for the target object, when the digital wallet client is used in the cloud-client collaboration mode, in step 202, a digital wallet server generates the at least one payment solution for the target object, and the digital wallet client acquires the at least one payment solution for the target object from the digital wallet server.

When there are at least two target objects (the target objects may be the same, or the target objects may be different), the at least one payment solution is obtained after multiple types of valid preference information of the at least two target objects are crosswise combined, and the valid preference information is preference information that can be used when the target object is paid for using an account in a digital wallet of the user.

When there is one target object, the at least one payment solution is obtained after a preference is offered using valid preference information of the target object, and/or, is obtained when no preference information is used for a preference (that is, the target object is paid for according to an original price of the target object).

Further, the at least one payment solution may include one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

During implementation, the acquired at least one payment solution may be a system default solution, or may be set by the user.

Step 203: Display the acquired at least one payment solution.

In an implementation manner, only a payment solution selected by the user may be displayed, in another implementation manner, all acquired payment solutions may be displayed (for example, a payment solution selected by the user is displayed prior to another solution).

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 2

Figure 3A:
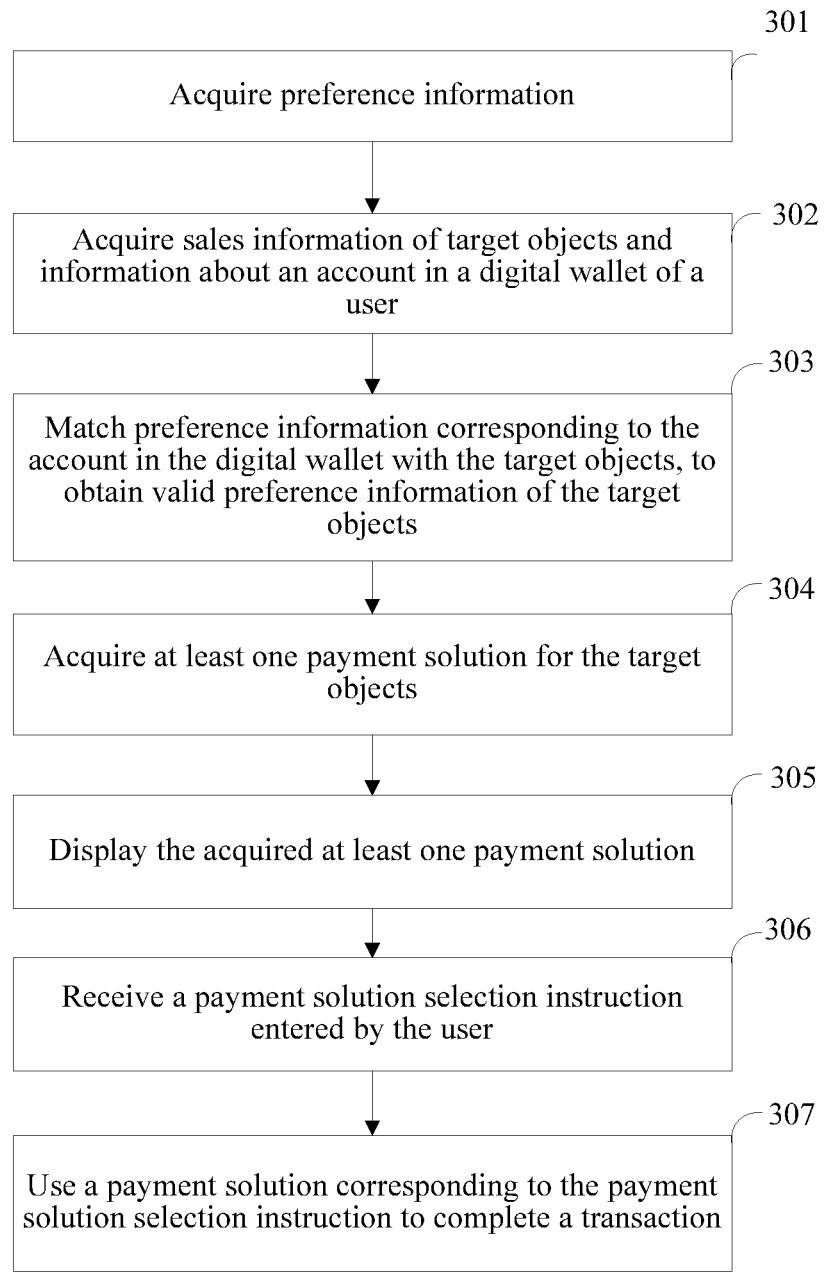
FIG. 3A is a schematic flowchart of a digital wallet-based transaction method according to Embodiment 2 of the present disclosure.
Figure 3B:
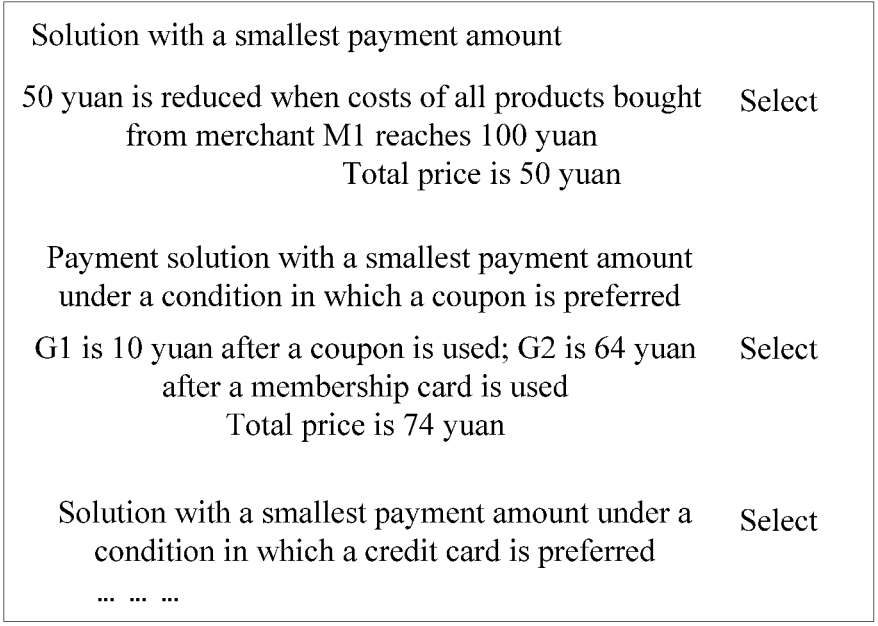
FIG. 3B is a schematic diagram of displaying a payment solution according to Embodiment 2 of the present disclosure.

This embodiment of the present disclosure provides a digital wallet-based transaction method. The method is executed by a digital wallet client, where the digital wallet client is used in a client local mode in this embodiment. Referring to FIG. 3A, the method includes:

Step 301: Acquire preference information.

The preference information may be various types of preference notification information set for a product or a service, such as an short messaging service (SMS) message, about a preference for using a credit card, sent by a bank, VIP discount information provided by a merchant, discount information of a specific product of a merchant published by Checkoo, group buying preference information of a specific product published by a group buying website.

In this embodiment, the digital wallet client acquires various types of preference information in advance, and an acquisition manner used by the digital wallet client may be that the digital wallet client receives and stores, in advance, various types of preference information pushed by various preference-offering parties, or the digital wallet client downloads preference information of a related merchant from a third party server in advance, and stores the preference information in the digital wallet client.

Step 302: Acquire sales information of target objects and information about an account in a digital wallet of a user.

The target object refers to a target product or service (for example, a product or a service that a user wants to buy). The sales information includes but is not limited to an identifier (for example, a code) or an original price of a product or a service, and the sales information may further include a name, a production place, and the like of a product or a service.

A digital wallet of a user may include multiple accounts, and the accounts may include one or more of a credit card account, a bank card account, a VIP card account, a bonus point account, and a coupon account. All these accounts may be used to pay for a target object, and both a merchant that issues a VIP card, a bonus point card, or a coupon and a bank that issues a bank card or a credit card are the above-described preference-offering parties. Correspondingly, the information about the account may be one or more card numbers of one or more bank cards, one or more card numbers of one or more credit cards, and card numbers of VIP cards, card numbers of bonus point cards, and numbers of coupons that are of multiple merchants, and the like.

During implementation, a manner of acquiring sales information of a target object by the digital wallet client may be as follows: during payment at a checkstand, a barcode, a two-dimensional code, an Radio Frequency Identification (RFID)tag, or the like of the target object is scanned using a cash register (or a Point Of Sale or point-of-sale terminal (POS) machine, or the like) to obtain the sales information of the target object, and the obtained sales information is sent to the digital wallet client, or the digital wallet client proactively acquires the sales information of the target object by scanning a barcode, a two-dimensional code, and RFID that are of the target object.

Step 303: Match preference information corresponding to the account in the digital wallet with the target objects, to obtain valid preference information of the target objects.

The valid preference information is preference information that can be used when the target object is paid for using the account in the digital wallet of the user.

In this embodiment, the digital wallet client associates the acquired sales information of the target objects with all the preference information, prestored in the digital wallet client, corresponding to the account in the digital wallet, and obtains, by means of matching, the valid preference information of the target objects according to a corresponding preference rule (for example, whether an expiration date of a preference is expired or whether the target object belongs to a type of a special offer).

In one embodiment, the valid preference information may include single item preference information of each target object in the target objects and overall preference information of all target objects in the target objects. The single item preference information refers to preference information of one (or a type of) target object, for example, a twenty percent discount is offered on women's shoes, the overall preference information refers to preference information of multiple (or multiple types of) target objects, for example, a ten percent discount is offered on all products when a membership card is used or 200 yuan coupons are returned when costs of all products reach 200 yuan.

Step 304: Acquire at least one payment solution for the target objects.

The at least one payment solution includes one or more of the following payment solutions a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

During implementation, the at least one payment solution may be acquired in the following manner: determining the valid preference information of the target objects, where the valid preference information includes single item preference information of each target object in the target objects and overall preference information of all target objects in the target objects, calculating a single-item actual payment amount after a preference is offered to each target object using the respective single item preference information, calculating, in a traversal manner, a total payment amount of the target objects using various combinations of the single-item actual payment amounts of the target objects, and generating a first payment solution, calculating a total payment amount of the target objects after a preference is offered to all the target objects using the overall preference information, and generating a second payment solution, and generating the at least one payment solution according to the first payment solution and the second payment solution.

It can be understood that both the first payment solution and the second payment solution may include multiple payment solutions.

Further, the valid preference information may further include partial preference information of some target objects in the target objects, and in this case, the acquiring at least one payment solution for the target objects further includes calculating a first actual payment amount of the some target objects after a preference is offered using the partial preference information, and calculating second actual payment amounts of the other target objects in the target objects except the some target objects after a preference is offered using respective single item preference information, and calculating, in a traversal manner, a total payment amount of the target objects using various combinations of the first actual payment amount and the second actual payment amounts, and generating a third payment solution.

Correspondingly, the generating the at least one payment solution according to the first payment solution and the second payment solution includes generating the at least one payment solution according to the first payment solution, the second payment solution, and the third payment solution.

Correspondingly, the third payment solution may also include multiple payment solutions.

During implementation, all target objects may be represented by a set G $\{G_1, \ldots, G_k, \ldots, G_n, ALL\}$, and a universal set D of optional payment manners corresponding to each target object $G_k$ is $\{D_1, \ldots, D_j, \ldots, D_n, \text{None}\}$, where ALL indicates that a preference may be offered to all or some target objects together, $D_j$ represents a preference manner, and "None" indicates that no preference manner is used (that is, an original price is used for payment). Therefore, a process of generating the first payment solution, the second payment solution, and the third payment solution may be as follows: first, actual payment amounts in various preference manners in the universal set D that may be used for one target object $G_k$ are calculated, then, actual payment amounts in various preference manners in the universal set D that may be used for all the target objects in the set G are calculated in a traversal manner, and finally, a total payment amount of all the target objects G in possible combination manners of all actual payment amounts are calculated, thereby generating the first payment solution. When a preference ALL is offered on all the target objects together, a total payment amount (that is, an actual payment amount) of all the target objects in the set G in this case is directly calculated, thereby generating the second payment solution. When a preference ALL is offered on some target objects together, first, an actual payment amount (that is, a first actual payment amount) obtained after the preference is offered to the some target objects is calculated, then, actual payment amounts (that is, second actual payment amounts) in various preference manners in the universal set D that may be used for each target object except the some target objects, and the actual payment amount (that is, the first actual payment amount) of the some target objects are combined, and a total payment amount is calculated using various combinations, thereby generating the third payment solution.

The following describes a process from step 301 to step 304 using an example In some embodiments, a current digital wallet of a user includes three accounts a credit card, a membership card, and a coupon. In addition, various types of preference information that are downloaded and stored in advance include a ten percent discount is offered when a product of merchant M1 or M2 is paid for using the credit card, a twenty percent discount is offered when a product G2/G3/G4 of the merchant M1 is paid for using the membership card, a fifty percent discount is offered when a product G1 of the merchant M1 is paid for using the coupon, and 50 yuan is reduced when costs of products bought from the merchant M1 reach 100 yuan. The user wants to buy the products G1 and G2 of the merchant M1.

Product code information and original prices, acquired from a cash register, of the products G1 and G2 are respectively as follows: the original price of G1 is 20 yuan, and the original price of G2 is 80 yuan. After the products G1 and G2 are matched with the prestored preference information, all valid preference information corresponding to the products G1 and G2 are acquired respectively as follows: G1: a ten percent discount is offered when the credit card is used for payment, a fifty percent discount is offered when the coupon is used for payment, G2: a ten percent discount is offered when the credit card is used for payment, a twenty percent discount is offered when the membership card is used for payment, and for all products of the merchant M1, 50 yuan is reduced when costs of products bought from the merchant M1 reach 100 yuan.

All payment manners, obtained through calculation, of the product G1 are 18 yuan is required for payment using the credit card, 10 yuan is required for payment using the coupon, and 20 yuan is required for paying at the original price. All payment manners, obtained through calculation, of the product G2 are 72 yuan is required for payment using the credit card, 64 yuan is required for payment using the coupon, and 80 yuan is required for paying at the original price.

All payment solutions of the products G1 and G2 in all permutations and combinations are obtained through calculation, and results are as follows: when both G1 and G2 are paid for using the credit card, a total payment amount is 90 yuan, when G1 is paid for using the coupon and G2 is paid for using the credit card, a total payment amount is 82 yuan, when G1 is paid for at the original price and G2 is paid for using the credit card, a total payment amount is 92 yuan, when G1 is paid for using the credit card and G2 is paid for using the membership card, a total payment amount is 82 yuan, when G1 is paid for using the coupon and G2 is paid for using the membership card, a total payment amount is 74 yuan, when G1 is paid for at the original price and G2 is paid for using the membership card, a total payment amount is 84 yuan, when G1 is paid for using the credit card and G2 is paid for at the original price, a total payment amount is 98 yuan, when G1 is paid for using the coupon and G2 is paid for at the original price, a total payment amount is 90 yuan, when G1 is paid for at the original price and G2 is paid for at the original price, a total payment amount is 100 yuan, and when the preference manner is used in which 50 yuan is reduced when costs of all products bought from the merchant M1 reach 100 yuan, a total payment amount is 50 yuan.

Step 305: Display the acquired at least one payment solution.

Display details of each payment solution may include code information (for example, a name of a product or a service), valid preference information, an actual payment amount, and a total payment amount that are of the product or the service. During implementation, a selection option may be added after each payment solution, where the selection option is used to facilitate a user to select a payment solution to make payments. A manner that a payment solution with a smallest payment amount comes first is used by default.

In another embodiment, the displaying the acquired at least one payment solution may further include receiving a payment solution setting instruction entered by the user, and displaying at least one payment solution including a payment solution corresponding to the payment solution setting instruction, where the payment solution setting instruction indicates that the user has performed a setting operation on a preferred payment solution, that is, in this implementation manner, a payment solution selected by the user may be displayed first according to different priorities.

It should be noted that, even though in a case in which the user has selected a payment solution, another payment solution than the payment solution may still be displayed to the user (for example, all payment solutions are displayed). For example, when the user selects that paying with a credit card is preferred, a payment solution with a smallest payment amount under a condition in which a credit card is preferred is displayed first, and other payment solutions are displayed in ascending order of payment amounts. In this way, an occurrence of a situation may be prevented in which a payment solution selected by the user is not a payment solution with a smallest payment amount while the user wants the payment solution with the smallest payment amount, because there is a situation in which when a payment solution is a payment solution with a smallest payment amount obtained under multiple preferred conditions (for example, a condition in which a credit card is preferred, a condition in which a VIP card is preferred, and a condition in which a coupon is preferred), the payment amount, of the payment solution, obtained after a preference is offered using multiple types of valid preference information may be less than a payment amount of any other payment solution, however, the user may not select the payment solution.

Based on the foregoing example, as shown in FIG. 3A, after the calculation in step 304, the digital wallet client provides three payment solutions for the user, and the payment solution with the smallest payment amount is displayed first, where display content of each payment solution includes a name of the payment solution, a name of each product, a preference manner used for each product, an actual payment amount of each product, a total payment amount, and a "select" option button.

Step 306: Receive a payment solution selection instruction entered by the user.

The payment solution selection instruction is used to indicate a payment solution selected by the user for completing this transaction.

Step 307: Use a payment solution corresponding to the payment solution selection instruction to complete a transaction.

In one embodiment, the digital wallet client may complete a payment transaction with a transaction merchant computer using an electronic payment platform according to an actual payment amount of each target object in the payment solution corresponding to the payment solution selection instruction entered by the user and a total payment amount of all the target objects.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability. In addition, all preference information is stored in advance by a digital wallet client, and during a transaction, the digital wallet client may obtain all valid preference information one time by means of matching, with no need to communicate with computers of preference-offering parties one by one, therefore, a transaction process is quick, and a user has a large quantity of choices because more than one solution is presented to the user.

Embodiment 3

Figure 4:
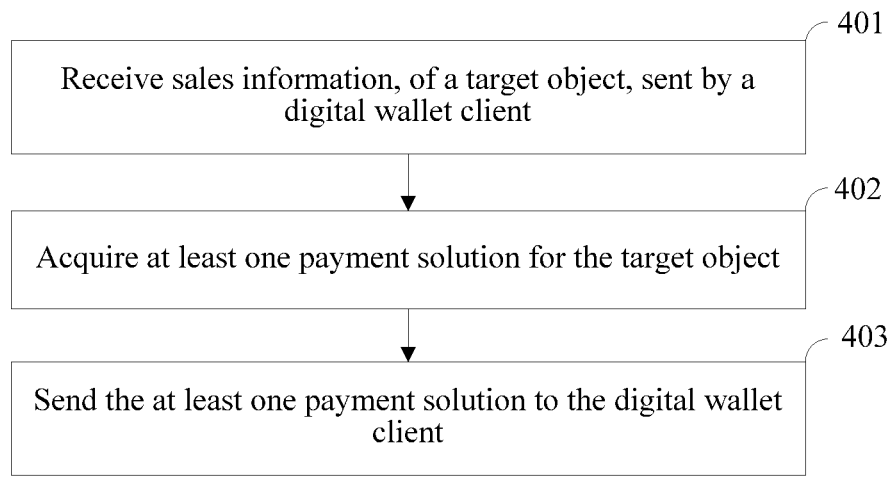
FIG. 4 is a schematic flowchart of a digital wallet-based transaction method according to Embodiment 3 of the present disclosure.

This embodiment of the present disclosure provides a digital wallet-based transaction method. The method is executed by the foregoing digital wallet server. Referring to FIG. 4, the method includes the following steps:

Step 401: Receive sales information, of a target object, sent by a digital wallet client.

Step 402: Acquire at least one payment solution for the target object.

When there are at least two target objects, the at least one payment solution is obtained after multiple types of valid preference information of the at least two target objects are crosswise combined, and the valid preference information is preference information that can be used when the target object is paid for using an account in a digital wallet of a user.

When there is one target object, the at least one payment solution is obtained after a preference is offered using valid preference information of the target object, and/or, is obtained when no preference information is used for a preference (that is, the target object is paid for according to an original price of the target object).

Further, the at least one payment solution may include one or more of the following payment solutions a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

Step 403: Send the at least one payment solution to the digital wallet client.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 4

Figure 5:
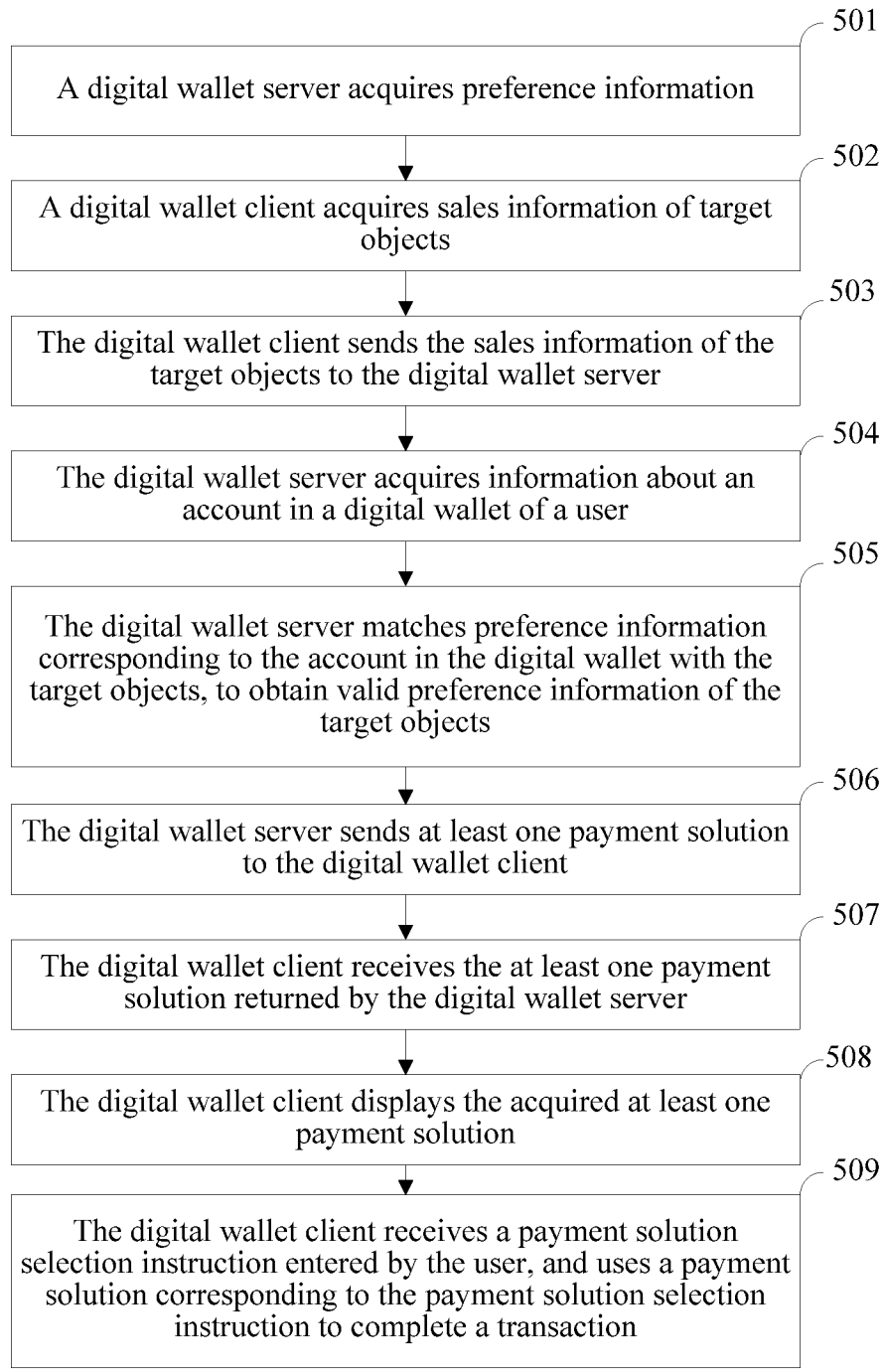
FIG. 5 is a schematic flowchart of a digital wallet-based transaction method according to Embodiment 4 of the present disclosure.

This embodiment of the present disclosure provides a digital wallet-based transaction method. The method is executed by the foregoing digital wallet client and the foregoing digital wallet server, where the digital wallet client is used in a cloud-client collaboration mode. Referring to FIG. 5, the method includes the following steps.

Step 501: A digital wallet server acquires preference information.

The preference information may be various types of preference notification information set for a product or a service, such as an SMS message, about a preference for using a credit card, sent by a bank, VIP discount information provided by a merchant, discount information of a specific product of a merchant published by Checkoo, group buying preference information of a specific product published by a group buying website.

In this embodiment, the digital wallet server acquires various types of preference information in advance, and the digital wallet server may proactively search for, download, and store all preference information. With a stronger operation capability and more abundant resources, the digital wallet server can obtain more possible preference information and news in real time.

Step 502: A digital wallet client acquires sales information of target objects.

In this embodiment, this step is the same as step 302, and details are not repeatedly described herein.

Step 503: The digital wallet client sends the sales information of the target objects to the digital wallet server.

In one embodiment, the digital wallet client may send the sales information of the target object to the digital wallet server using the foregoing network.

Step 504: The digital wallet server acquires information about an account in a digital wallet of a user.

In this embodiment, the digital wallet server may obtain the information about the account in the digital wallet of the user by storing, in advance, information related to the account in the digital wallet of the user.

In another embodiment, the digital wallet client may also acquire the information about the account in the digital wallet of the user, and then send the information to the digital wallet server.

Step 505: The digital wallet server matches preference information corresponding to the account in the digital wallet with the target objects, to obtain valid preference information of the target objects.

This step is the same as step 304, and details are not repeatedly described herein.

Step 506: The digital wallet server sends at least one payment solution to the digital wallet client.

Step 507: The digital wallet client receives the at least one payment solution returned by the digital wallet server.

In one embodiment, the digital wallet server and the digital wallet client in step 506 and step 507 may interact using the foregoing network.

Step 508: The digital wallet client displays the acquired at least one payment solution.

Step 509: The digital wallet client receives a payment solution selection instruction entered by the user, and uses a payment solution corresponding to the payment solution selection instruction to complete a transaction.

Step 508 and step 509 are the same as step 305 to step 307, and details are not repeatedly described herein.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability. In addition, all preference information is stored in advance by a digital wallet server, and during a transaction, the digital wallet server may obtain all valid preference information one time by means of matching, with no need to communicate with computers of preference-offering parties one by one, therefore, the transaction is quicker, and a user has a large quantity of choices because more than one solution is presented to the user. Moreover, the digital wallet server has a stronger computation capability and resource acquiring capability, and the digital wallet server in this case can possess more preference information and news and a faster payment solution generating speed.

Embodiment 5

Figure 6:
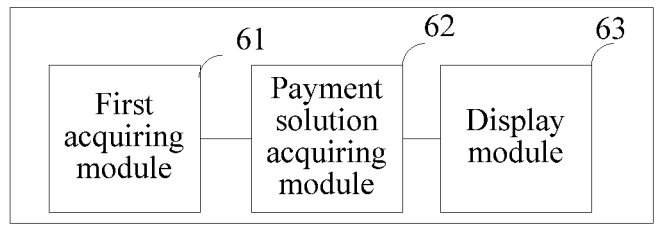
FIG. 6 is a schematic structural diagram of a digital wallet-based transaction apparatus according to Embodiment 5 of the present disclosure.

This embodiment of the present disclosure provides a digital wallet-based transaction apparatus. The apparatus is a digital wallet client, where the digital wallet client is used in a client local mode or a cloud-client collaboration mode. Referring to FIG. 6, the apparatus includes a first acquiring module 61 configured to acquire sales information of a target object, a payment solution acquiring module 62 configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a display module 63 configured to display the acquired payment solution.

When there is one target object, the at least one payment solution is obtained after a preference is offered using valid preference information of the target object, and/or, is obtained when no preference information is used for a preference (that is, the target object is paid for according to an original price of the target object).

Further, the at least one payment solution may include one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 6

Figure 7:
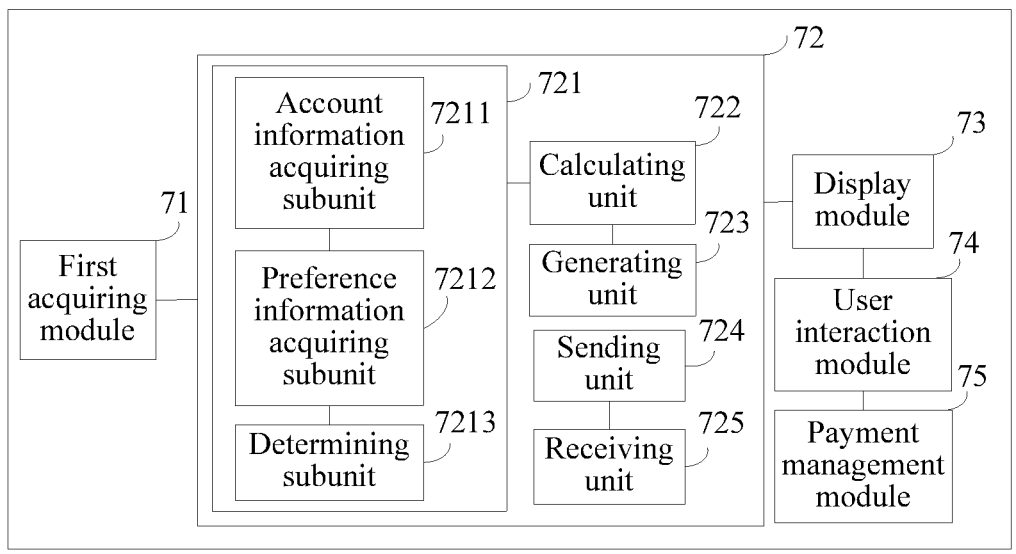
FIG. 7 is a schematic structural diagram of a digital wallet-based transaction apparatus according to Embodiment 6 of the present disclosure.

This embodiment of the present disclosure provides a digital wallet-based transaction apparatus. The apparatus is a digital wallet client, where the digital wallet client is used in a client local mode or a cloud-client collaboration mode. Referring to FIG. 7, the apparatus includes a first acquiring module 71 configured to acquire sales information of a target object, a payment solution acquiring module 72 configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a display module 73 configured to display the acquired at least one payment solution.

The target object refers to a target product or service (for example, a product or a service that a user wants to buy). The sales information includes but is not limited to code information and an original price, where the code information may further include a name, a digital code, a production place, and the like of a product or a service.

The at least one payment solution includes one or more of the following payment solutions a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

In a possible implementation manner, the payment solution acquiring module 72 may include a valid-preference determining unit 721 configured to acquire the valid preference information of the target objects, where the valid preference information includes single item preference information of each target object in the target objects and overall preference information of all target objects in the target objects, a calculating unit 722 configured to calculate a single-item actual payment amount after a preference is offered to each target object using the respective single item preference information, calculate, in a traversal manner, a total payment amount of the target objects using various combinations of the single-item actual payment amounts of the target objects, and generate a first payment solution, and configured to calculate a total payment amount of the target objects after a preference is offered to all the target objects using the overall preference information, and generate a second payment solution, and a generating unit 723 configured to generate the at least one payment solution according to the first payment solution and the second payment solution.

All target objects may be represented by a set G $\{G_1, \ldots, G_k, \ldots, G_n, \text{ALL}\}$, and a universal set D of optional payment manners corresponding to each target object $G_k$ is $\{D_1, \ldots, D_j, \ldots, D_n, \text{None}\}$, where ALL indicates that a preference may be offered to all or some target objects together, $D_j$ represents a preference manner, and "None" indicates that no preference manner is used (that is, an original price is used for payment).

Further, the valid preference information may further include partial preference information of some target objects in the target objects.

The calculating unit 722 is further configured to calculate a first actual payment amount of the some target objects after a preference is offered using the partial preference information, and calculate second actual payment amounts of the other target objects in the target objects except the some target objects after a preference is offered using respective single item preference information, and calculate, in a traversal manner, a total payment amount of the target objects using various combinations of the first actual payment amount and the second actual payment amounts, and generate a third payment solution.

The generating unit 723 is configured to generate the at least one payment solution according to the first payment solution, the second payment solution, and the third payment solution.

It can be understood that the first payment solution, the second payment solution, and the third payment solution may all include multiple payment solutions.

Further, the valid-preference determining 721 further includes an account information subunit 7211 configured to acquire information about the account in the digital wallet of the user, where the account includes one or more of a credit card account, a bank card account, a VIP card account, a bonus point account, and a coupon account, a preference information acquiring subunit 7212 configured to acquire preference information corresponding to the account, and a determining subunit 7213 configured to match the preference information corresponding to the information about the account with the target objects, to obtain the valid preference information of the target objects.

The target object refers to a target product or service (for example, a product or a service that a user wants to buy). The sales information includes but is not limited to an identifier (for example, a code) or an original price of a product or a service, and the sales information may further include a name, a production place, and the like of a product or a service. During implementation, a manner of acquiring sales information of a target object by the digital wallet client may be as follows during payment at a checkstand, a barcode, a two-dimensional code, an RFID tag, or the like of the target object is scanned using a cash register (or a POS machine, or the like) to obtain the sales information of the target object, and the obtained sales information is sent to the digital wallet client, or the digital wallet client proactively acquires the sales information of the target object by scanning a barcode, a two-dimensional code, and RFID that are of the target object.

A digital wallet of a user may include multiple accounts. All these accounts may be used to pay for a target object, and both a merchant that issues a VIP card, a bonus point card, or a coupon and a bank that issues a bank card or a credit card are the above-described preference-offering parties. Correspondingly, the information about the account may be one or more card numbers of one or more bank cards, one or more card numbers of one or more credit cards, and card numbers of VIP cards, card numbers of bonus point cards, and numbers of coupons that are of multiple merchants, and the like.

The preference information may be various types of preference notification information set for a product or a service, such as an SMS message, about a preference for using a credit card, sent by a bank, VIP discount information provided by a merchant, discount information of a specific product of a merchant published by Checkoo, group buying preference information of a specific product published by a group buying website.

The valid preference information is preference information that can be used when the target object is paid for using the account in the digital wallet of the user. In one embodiment, the digital wallet client may obtain, by means of matching, the valid preference information of the target objects according to a corresponding preference rule (for example, whether an expiration date of a preference is expired or whether the target object belongs to a type of a special offer).

In another possible implementation manner, the payment solution acquiring module 72 may further include a sending unit 724 configured to send the sales information of the target object to a digital wallet server, and a receiving unit 725 configured to receive the at least one payment solution returned by the digital wallet server, where when there are at least two target objects, the at least one payment solution is obtained by the digital wallet server by crosswise combining the multiple types of valid preference information of the at least two target objects.

During implementation, display details of each payment solution may include code information (for example, a name of a product or a service), valid preference information, an actual payment amount, and a total payment amount that are of the product or the service.

In another embodiment, the apparatus further includes a user interaction module 74 configured to receive a payment solution setting instruction entered by the user. The display module 73 is further configured to display at least one payment solution including a payment solution corresponding to the payment solution setting instruction.

Further, the user interaction module 74 is further configured to receive a payment determining instruction entered by the user. The payment determining instruction is used to indicate the digital wallet client that the user has executed a payment determining operation. The apparatus may further include a payment management module 75 configured to use a payment solution corresponding to a payment solution selection instruction to complete a transaction.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability. In addition, all preference information is stored in advance by a digital wallet client, and during a transaction, the digital wallet client may obtain all valid preference information one time by means of matching, with no need to communicate with computers of preference-offering parties one by one, therefore, the transaction is quicker, and a user has a large quantity of choices because more than one solution is presented to the user.

Embodiment 7

Figure 8:
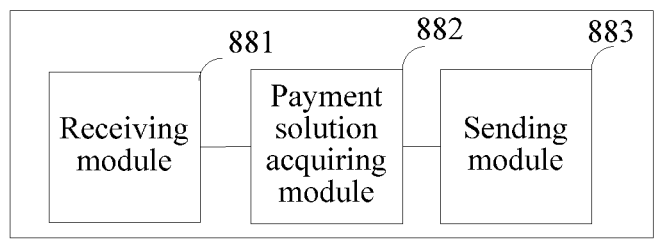
FIG. 8 is a schematic structural diagram of a digital wallet-based transaction apparatus according to Embodiment 7 of the present disclosure.

This embodiment provides a digital wallet-based transaction apparatus. The apparatus is a digital wallet server. Referring to FIG. 8, the apparatus includes a receiving module 881 configured to receive sales information, of a target object, sent by a digital wallet client, a payment solution acquiring module 882 configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a sending module 883 configured to send the at least one payment solution to the digital wallet client.

The at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 8

Figure 9:
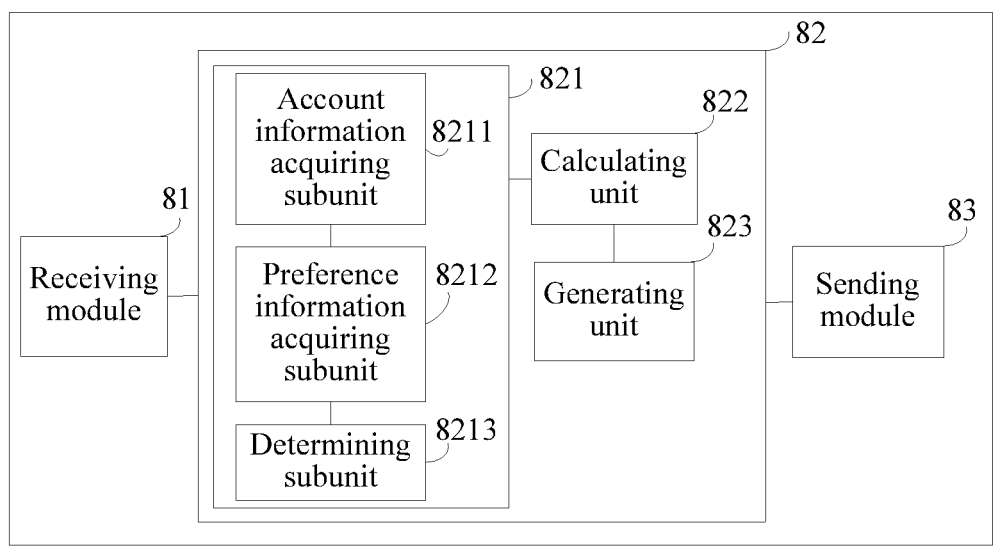
FIG. 9 is a schematic structural diagram of a digital wallet-based transaction apparatus according to Embodiment 8 of the present disclosure.

This embodiment provides a digital wallet-based transaction apparatus. The apparatus is a digital wallet server. Referring to FIG. 9, the apparatus includes a receiving module 81 configured to receive sales information, of a target object, sent by a digital wallet client, a payment solution acquiring module 82 configured to acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and a sending module 83 configured to send the at least one payment solution to the digital wallet client.

The at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

Further, the payment solution acquiring module 82 may include a valid-preference determining unit 821 configured to generate the valid preference information of the target objects, where the valid preference information includes single item preference information and overall preference information that are provided by each account in the digital wallet of the user, a calculating unit 822 configured to acquire the valid preference information of the target objects, where the valid preference information includes single item preference information of each target object in the target objects and overall preference information of all target objects in the target objects, and configured to calculate a single-item actual payment amount after a preference is offered to each target object using the respective single item preference information, calculate, in a traversal manner, a total payment amount of the target objects using various combinations of the single-item actual payment amounts of the target objects, and generate a first payment solution, and a generating unit 823 configured to generate the at least one payment solution according to the first payment solution and a second payment solution.

Further, the valid preference information may further include partial preference information of some target objects in the target objects.

The calculating unit 822 is configured to calculate a first actual payment amount of the some target objects after a preference is offered using the partial preference information, and calculate second actual payment amounts of the other target objects in the target objects except the some target objects after a preference is offered using respective single item preference information, and calculate, in a traversal manner, a total payment amount of the target objects using various combinations of the first actual payment amount and the second actual payment amounts, and generate a third payment solution.

The generating unit 823 is further configured to generate the at least one payment solution according to the first payment solution, the second payment solution, and the third payment solution.

It can be understood that the first payment solution, the second payment solution, and the third payment solution may all include multiple payment solutions.

Further, the valid-preference determining unit 821 includes an account acquiring subunit 8211 configured to receive information, about the account in the digital wallet of the user, sent by the digital wallet client, where the account includes one or more of a credit card account, a bank card account, a VIP card account, a bonus point account, and a coupon account, a preference information acquiring subunit 8212 configured to acquire preference information corresponding to the account, and a determining subunit 8213 configured to match the preference information corresponding to the information about the account with the target objects, to obtain the valid preference information of the target objects.

A digital wallet of a user may include multiple accounts. All these accounts may be used to pay for a target object, and both a merchant that issues a VIP card, a bonus point card, or a coupon and a bank that issues a bank card or a credit card are the above-described preference-offering parties. Correspondingly, the information about the account may be one or more card numbers of one or more bank cards, one or more card numbers of one or more credit cards, and card numbers of VIP cards, card numbers of bonus point cards, and numbers of coupons that are of multiple merchants, and the like.

The preference information may be various types of preference notification information set for a product or a service, such as an SMS message, about a preference for using a credit card, sent by a bank, VIP discount information provided by a merchant, discount information of a specific product of a merchant published by Checkoo, group buying preference information of a specific product published by a group buying website.

In one embodiment, the digital wallet server may obtain, by means of matching, the valid preference information of the target objects according to a corresponding preference rule (for example, whether an expiration date of a preference is expired or whether the target object belongs to a type of a special offer).

During implementation, details of each payment solution may include code information (for example, a name of a product or a service), valid preference information, an actual payment amount, and a total payment amount that are of the product or the service.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability. In addition, all preference information is stored in advance by a digital wallet server, and during a transaction, the digital wallet server may obtain all valid preference information one time by means of matching, with no need to communicate with computers of preference-offering parties one by one, therefore, the transaction is quicker, and a user has a large quantity of choices because more than one solution is presented to the user. Moreover, the digital wallet server has a stronger computation capability and resource acquiring capability, and the digital wallet server in this case can possess more preference information and news and a faster payment solution generating speed.

Embodiment 9

Figure 10:
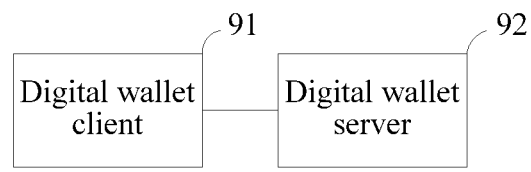
FIG. 10 is a schematic structural diagram of a digital wallet-based transaction system according to Embodiment 9 of the present disclosure.

This embodiment provides a digital wallet-based transaction system. Referring to FIG. 10, the system includes a digital wallet client 91 and a digital wallet server 92.

The digital wallet client 91 is configured to acquire sales information of a target object, and send the sales information of the target object to the digital wallet server 92.

The digital wallet server 92 is configured to receive the sales information, of the target object, sent by the digital wallet client, acquire at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and send the at least one payment solution to the digital wallet client 91.

The digital wallet client 91 is further configured to receive the at least one payment solution and display the received at least one payment solution.

The digital wallet client 91 and the digital wallet server 92 may be the digital wallet client and the digital wallet server in Embodiment 4, and detailed descriptions are omitted herein.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 10

Figure 11:
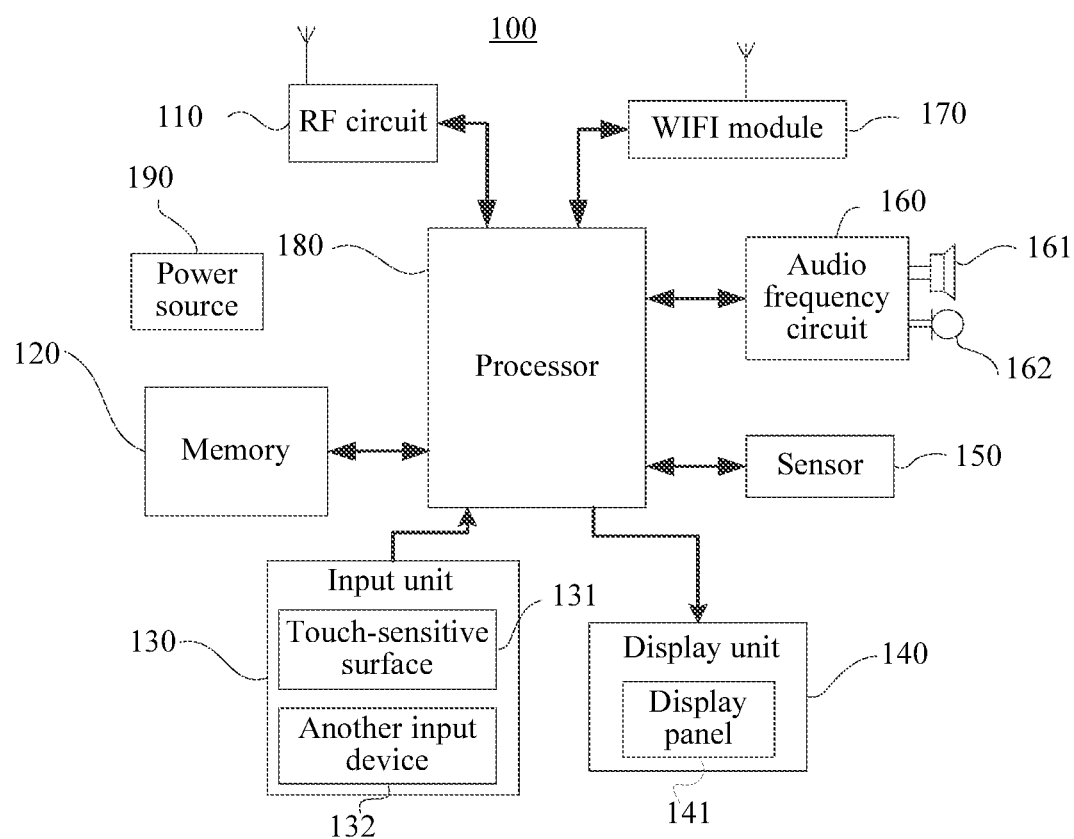
FIG. 11 is a schematic structural diagram of a terminal according to Embodiment 10 of the present disclosure.

This embodiment provides a terminal. Referring to FIG. 11, the terminal may include a mobile phone, a tablet computer, a PDA, a POS machine, a vehicle-mounted computer, and the like.

FIG. 11 is a block diagram of a part of a structure of a terminal 100 related to this embodiment of the present disclosure. Referring to FIG. 11, the terminal 100 includes components such as a radio frequency (RF) circuit 110, a memory 120, an input unit 130, a display unit 140, a sensor 150, an audio frequency circuit 160, a WiFi module 170, a processor 180, and a power source 190. A person skilled in the art may understand that a structure of a mobile phone shown in FIG. 11 does not constitute a limitation to the mobile phone, and the mobile phone may include parts more components or fewer components than those shown in the figure, or some components may be combined, or a different component deployment may be used.

The following describes the components of the terminal 100 with reference to FIG. 11.

The RF circuit 110 may be configured to receive and send signals during an information receiving and sending process or a call process, and receive downlink information from a base station, and send the downlink information to the processor 180 for processing, and in addition, send related uplink data to the base station. Generally, the RF circuit includes but is not limited to an antenna, at least one amplifier, a transceiver, a coupler, a low noise amplifier (LNA), a duplexer, and the like. Moreover, the RF circuit 110 may also communicate with a network and another device by means of wireless communication. During the wireless communication, any communications standard or protocol may be used, including but not limited to GSM (, general packet radio service (GPRS), CDMA, Wideband Code Division Multiple Access (WCDMA), LTE, E-mail, Short Messaging Service (SMS), and the like.

The memory 120 may be configured to store a software program and module, the processor 180 executes various functional applications and data processing of the terminal 100 by running the software program and module stored in the memory 120. The memory 120 may mainly include a program storage area and a data storage area, where the program storage area may be used to store an operating system, an application program required by at least one function (for example, a sound playback function and an image playback function), and the like, and the data storage area may be used to store data (for example, audio data and an address book), and the like, created according to use of the terminal 100. Moreover, the memory 120 may include a high speed random access memory, and may also include a non-volatile memory such as at least one magnetic disk storage device, a flash memory, or another volatile solid-state storage device.

The input unit 130 may be configured to receive input digit or character information and generate a keyboard signal input related to user setting and function control of the terminal 100. In one embodiment, the input unit 130 may include a touch panel 131 and another input device 132. The touch panel 131, also referred to as a touch screen, may collect a touch operation of a user on or near the touch panel 131 (for example, an operation of a user on or near the touch panel 131 using any other suitable object or accessory such as a finger or a stylus), and drive a corresponding connection apparatus according to a preset program. In one embodiment, the touch panel 131 may include two parts, a touch detection apparatus and a touch controller. The touch detection apparatus detects a touch location of the user, detects a signal generated by the touch operation, and transmits the signal to the touch controller. The touch controller receives the touch information from the touch detection apparatus, converts the touch information into touch point coordinates, and sends the touch point coordinates to the processor 180, the touch controller can receive and execute a command sent from the processor 180. Moreover, the touch panel 131 may be a resistive, capacitive, infrared, or surface sound wave type touch panel. In addition to the touch panel 131, the input unit 130 may further include the other input device 132. In one embodiment, the other input device 132 may include but is not limited to one or more of a physical keyboard, a functional button (for example, a volume control button or a switch button), a track ball, a mouse, a joystick, and the like.

The display unit 140 may be configured to display information input by the user or information provided for the user, and various menus of the terminal 100. The display unit 140 may include a display panel 141. In one embodiment, the display panel 141 may be configured using an Liquid Crystal Display (LCD), an Organic Light-Emitting Diode (OLED), or the like. Further, the touch panel 131 may cover the display panel 141. After detecting a touch operation on or near the touch panel 131, the touch panel 131 transmits the touch operation to the processor 180, so as to determine a type of a touch event. Then, the processor 180 provides a corresponding visual output on the display panel 141 according to the type of the touch event. Although, in FIG. 11, the touch panel 131 and the display panel 141 are used as two separate parts to implement input and input functions of the terminal 100, in some embodiments, the touch panel 131 and the display panel 141 may be integrated to implement the input and output functions of the terminal 100.

The terminal 100 may further include at least one sensor 150 such as an optical sensor, a motion sensor, and other sensors. In one embodiment, the optical sensor may include an ambient light sensor and a proximity sensor, where the ambient light sensor may adjust luminance of the display panel 141 according to brightness of ambient light, and the proximity sensor may switch off the display panel 141 and/or backlight when the terminal 100 is moved to an ear. As one type of motion sensor, an accelerometer sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (for example, a pedometer or a knock), and the like. Other sensors such as a gyroscope, a barometer, a hygrometer, a thermometer, and an infrared sensor, which may be configured in the terminal 100, are not repeatedly described herein.

The audio frequency circuit 160, a loudspeaker 161, and a microphone 162 may provide audio interfaces between the user and the terminal 100. The audio frequency circuit 160 may convert received audio data into an electric signal and transmit the electric signal to the loudspeaker 161, and the loudspeaker 161 converts the electric signal into a sound signal for output, on the other hand, the microphone 162 converts a collected sound signal into an electric signal, and the audio frequency circuit 160 receives the electric signal, converts the electric signal into audio data, and outputs the audio data to the RF circuit 110, so as to send the audio data to, for example, another mobile phone, or outputs the audio data to the memory 120 for further processing.

WiFi belongs to a short-distance wireless transmission technology, and the terminal 100 may help, using the WiFi module 170, the user to receive and send e-mails, browse a webpage, access streaming media, and the like. The WiFi module 170 provides wireless broadband Internet access for the user. Although the WiFi module 170 is shown in FIG. 11, it can be understood that the WiFi module 170 is not a necessary component of the terminal 100, and when required, the WiFi module 170 may be omitted as long as the scope of the essence of the present disclosure is not changed.

The processor 180 is a control center of the terminal 100, and is connected to all the parts of the entire mobile phone using various interfaces and lines, and executes various functions of the terminal 100 and processes data by running or executing the software program and/or module stored in the memory 120 and invoking data stored in the memory 120, thereby performing overall monitoring on the mobile phone. In one embodiment, the processor 180 may include one or more processing units. Preferably, the processor 180 may integrate an application processor and a modem, where the application processor mainly processes an operating system, a user interface, an application program, and the like, and the modem mainly processes wireless communication. It can be understood that the modem may also not be integrated into the processor 180.

The terminal 100 may further include the power source 190 (for example, a battery) that supplies power to the components. Preferably, the power source may be logically connected to the processor 180 using a power source management system, so as to implement functions such as charging, discharging, and power consumption management using the power source management system.

Although not shown in the figure, the terminal 100 may further include a camera, a BLUETOOTH module, and the like, and details are not repeatedly described herein. In this embodiment, the terminal device further includes the memory, one or more programs, where the one or more programs are stored in the memory and are configured, so as to be executed by the one or more processors, where the one or more programs include instructions used to perform the following operations: acquiring sales information of a target object, acquiring at least one payment solution for the target object, and displaying the acquired at least one payment solution.

When there are at least two target objects, the at least one payment solution is obtained after multiple types of valid preference information of the at least two target objects are crosswise combined, and the valid preference information is preference information that can be used when the target object is paid for using an account in a digital wallet of a user.

Further, the at least one payment solution includes one or more of the following payment solutions: a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

In an implementation manner, the acquiring at least one payment solution for the target object may include determining the valid preference information of the target objects, where the valid preference information includes single item preference information of each target object in the target objects and overall preference information of all target objects in the target objects, calculating a single-item actual payment amount after a preference is offered to each target object using the respective single item preference information, calculating, in a traversal manner, a total payment amount of the target objects using various combinations of the single-item actual payment amounts of the target objects, and generating a first payment solution, calculating a total payment amount of the target objects after a preference is offered to all the target objects using the overall preference information, and generating a second payment solution, and generating the at least one payment solution according to the first payment solution and the second payment solution.

In one embodiment, the valid preference information further includes partial preference information of some target objects in the target objects.

The acquiring at least one payment solution for the target object may further include calculating a first actual payment amount of the some target objects after a preference is offered using the partial preference information, and calculating second actual payment amounts of the other target objects in the target objects except the some target objects after a preference is offered using respective single item preference information, and calculating, in a traversal manner, a total payment amount of the target objects using various combinations of the first actual payment amount and the second actual payment amounts, and generating a third payment solution.

The generating the at least one payment solution according to the first payment solution and the second payment solution includes generating the at least one payment solution according to the first payment solution, the second payment solution, and the third payment solution.

Further, the determining the valid preference information of the target objects may include acquiring information about the account in the digital wallet of the user, where the account includes one or more of a credit card account, a bank card account, a VIP card account, a bonus point account, and a coupon account, acquiring preference information corresponding to the account, and matching the preference information corresponding to the information about the account with the target objects, to obtain the valid preference information of the target objects.

The preference information may be various types of preference notification information set for a product or a service, such as an SMS message, about a preference for using a credit card, sent by a bank, VIP discount information provided by a merchant, discount information of a specific product of a merchant published by Checkoo, group buying preference information of a specific product published by a group buying website.

In another implementation manner, the acquiring at least one payment solution for the target object includes sending the sales information of the target object to a digital wallet server, and receiving the at least one payment solution returned by the digital wallet server, where when there are at least two target objects, the at least one payment solution is obtained by the digital wallet server by crosswise combining the multiple types of valid preference information of the at least two target objects.

In one embodiment, the displaying the acquired at least one payment solution may include receiving a payment solution setting instruction entered by the user, and displaying at least one payment solution including a payment solution corresponding to the payment solution setting instruction.

It can be understood that the one or more programs may further include an instruction used to perform the following operations: receiving a payment solution selection instruction entered by the user, and using a payment solution corresponding to the payment solution selection instruction to complete a transaction.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

Embodiment 11

Figure 12:
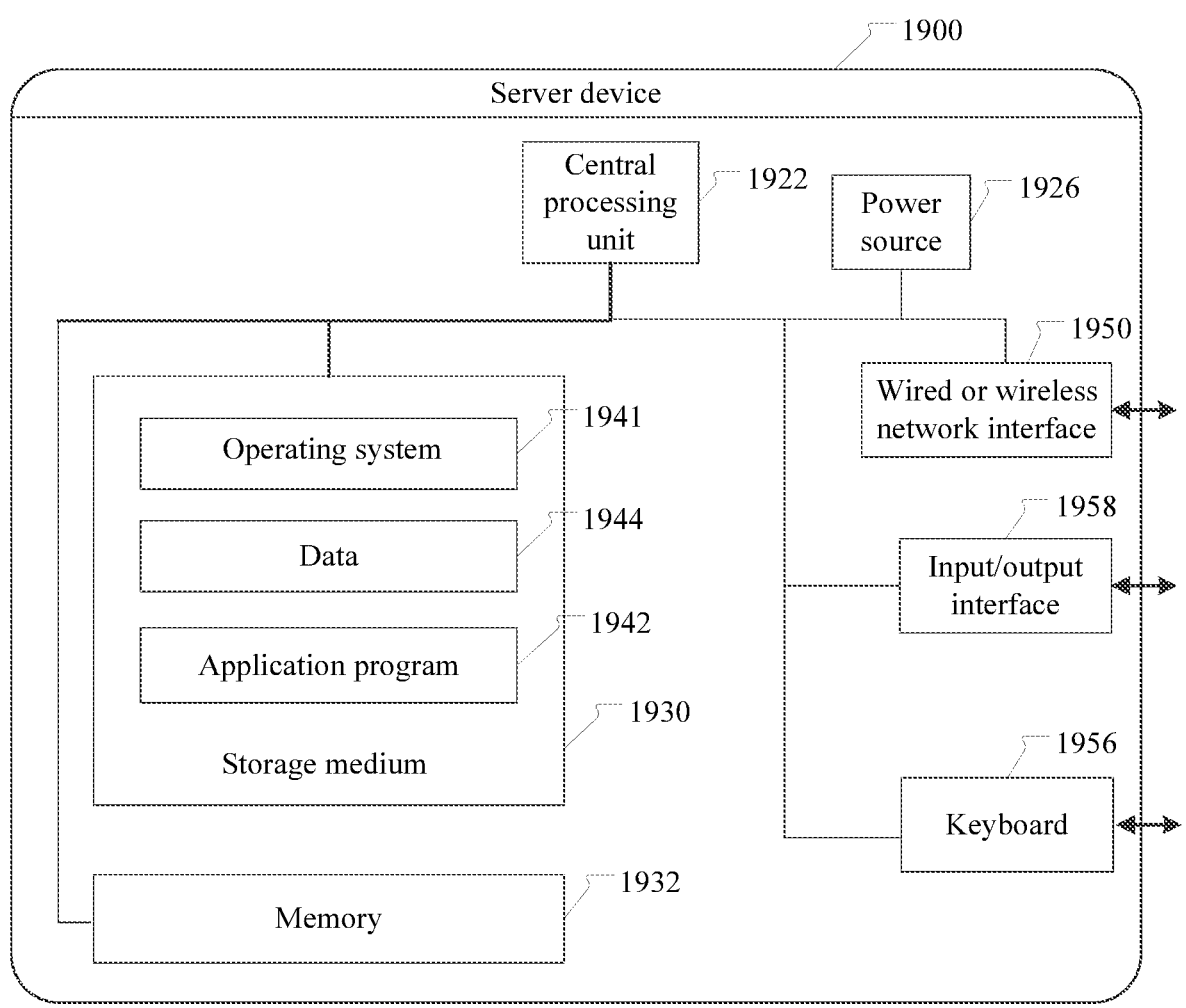
FIG. 12 is a schematic structural diagram of a server according to Embodiment 11 of the present disclosure.

This embodiment provides a server. Referring to FIG. 12, the server 1900 may vary greatly because of a difference in configuration or performance, and may include one or more central processing units (CPU) 1922 (for example, one or more processors), a memory 1932, and one or more storage medium 1930 (for example, one or more massive storage devices) that store an application program 1942 or data 1944. The memory 1932 and the storage medium 1930 may be used for temporary storage or persistent storage. The program stored in the storage medium 1930 may include one or more modules (not shown in the figure), and each module may include a series of instruction operations in the server. Further, the central processing unit 1922 may be set to communicate with the storage medium 1930, and executes, on the server 1900, the series of instruction operations in the storage medium 1930.

The server 1900 may further include one or more power sources 1926, one or more wired or wireless network interfaces 1950, one or more input/output interfaces 1958, one or more keyboards 1956, and/or one or more operating systems 1941 such as Windows Server™, Mac Operating System (OS) X™, Unix™, Linux™, FreeBSD™.

The apparatus 1900 includes the CPU, the memory, and one or more programs, where the one or more programs are stored in the memory and are configured, so as to be executed by the one or more CPUs, where the one or more programs include instructions used to perform the following operations receiving sales information, of a target object, sent by a digital wallet client, acquiring at least one payment solution for the target object, where when there are at least two target objects, the at least one payment solution is obtained after multiple types of valid preference information of the at least two target objects are crosswise combined, and the valid preference information is preference information that can be used when the target object is paid for using an account in a digital wallet of a user, and sending the at least one payment solution to the digital wallet client.

The at least one payment solution includes one or more of the following payment solutions a payment solution with a smallest payment amount under a cash payment condition, a payment solution with a smallest payment amount under a condition in which a credit card is preferred, a payment solution with a smallest payment amount under a condition in which a deposit card is preferred, a payment solution with a smallest payment amount under a condition in which a VIP card is preferred, a payment solution with a smallest payment amount under a condition in which a coupon is preferred, and a payment solution with a smallest payment amount under a condition in which bonus points are preferred.

In an actual application, the target object refers to a target product or service (for example, a product or a service that a user wants to buy). The sales information includes but is not limited to an identifier (for example, a code) or an original price of a product or a service, and the sales information may further include a name, a production place, and the like of a product or a service.

In one embodiment, the acquiring at least one payment solution for the target object may include determining the valid preference information of the target objects, where the valid preference information includes single item preference information of each target object in the target objects and overall preference information of all target objects in the target objects, calculating a single-item actual payment amount after a preference is offered to each target object using the respective single item preference information, calculating, in a traversal manner, a total payment amount of the target objects using various combinations of the single-item actual payment amounts of the target objects, and generating a first payment solution, calculating a total payment amount of the target objects after a preference is offered to all the target objects using the overall preference information, and generating a second payment solution, and generating the at least one payment solution according to the first payment solution and the second payment solution.

In this embodiment, the valid preference information may further include partial preference information of some target objects in the target objects.

The acquiring at least one payment solution for the target object may further include calculating a first actual payment amount of the some target objects after a preference is offered using the partial preference information, and calculating second actual payment amounts of the other target objects in the target objects except the some target objects after a preference is offered using respective single item preference information, and calculating, in a traversal manner, a total payment amount of the target objects using various combinations of the first actual payment amount and the second actual payment amounts, and generating a third payment solution.

The generating the at least one payment solution according to the first payment solution and the second payment solution includes generating the at least one payment solution according to the first payment solution, the second payment solution, and the third payment solution.

Further, the determining the valid preference information of the target objects may include acquiring information about the account in the digital wallet of the user, where the account includes one or more of a credit card account, a bank card account, a VIP card account, a bonus point account, and a coupon account, acquiring preference information corresponding to the account, and matching the preference information corresponding to the information about the account with the target objects, to obtain the valid preference information of the target objects.

According to this embodiment of the present disclosure, sales information of a target object is acquired, and when there are at least two target objects, a payment solution is generated by crosswise combining multiple types of valid preference information of the at least two target objects, thereby obtaining a payment solution that better meets a user demand, which gives full consideration to user benefits and has strong practicability.

It should be noted that when a payment solution is provided by the digital wallet-based transaction apparatus according to the foregoing embodiments, division of the foregoing functional modules is only used as an example, in an actual application, the foregoing functions may be allocated to and completed by different functional modules according to a requirement, that is, an internal structure of the apparatus is divided into different functional modules, so as to perform all or some functions described above. In addition, the foregoing embodiments and the embodiments of the digital wallet-based transaction method belong to a same inventive concept. For a specific implementation process, reference is made to the method embodiments, and details are not repeatedly described herein.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A digital wallet-based transaction method implemented by a digital wallet client, comprising:
    receiving, by a receiver of the digital wallet client, sales information of a plurality of target objects;
    determining, by a processor coupled to the receiver, valid preference information separately for each of the plurality of target objects based on the sales information, wherein the valid preference information is a preference for using a payment solution for each of the target objects;
    determining, by the processor, a plurality of payment solutions separately for each of the plurality of target objects based on the valid preference information for each of the plurality of target objects;
    determining, by the processor, a plurality of different payment solutions based on a plurality of different permutations and combinations of the payment solutions for each of the plurality of target objects; and
    displaying, by a display of the digital wallet client, the different payment solutions for the plurality of the target objects.

2. The method according to claim 1, wherein the payment solutions for each of the target objects comprise at least one of a first payment solution with a smallest payment amount under a cash payment condition, a second payment solution with a smallest payment amount under a condition in which a credit card is preferred, a third payment solution with a smallest payment amount under a condition in which a deposit card is preferred, a fourth payment solution with a smallest payment amount under a condition in which a very important person (VIP) card is preferred, a fifth payment solution with a smallest payment amount under a condition in which a coupon is preferred, or a sixth payment solution with a smallest payment amount under a condition in which bonus points are preferred.

3. The method according to claim 1, wherein the valid preference information comprises single item preference information of each target object in the target objects and overall preference information of all target objects in the target objects, and wherein the method further comprises:
    calculating, by the processor, a single-item actual payment amount after a preference is offered to each target object using the respective single item preference information;
    calculating, by the processor in a traversal manner, a total payment amount of the target objects using different combinations of the single-item actual payment amounts of the target objects;
    generating, by the processor, a first payment solution;
    calculating, by the processor, a total payment amount of the target objects after a preference is offered to all the target objects using the overall preference information;
    generating, by the processor, a second payment solution; and
    generating, by the processor, at least one payment solution according to the first payment solution and the second payment solution.

4. The method according to claim 3, wherein the valid preference information further comprises partial preference information of a subset of the target objects, and wherein the method further comprises:
    calculating, by the processor, a first actual payment amount of the subset of the target objects after the preference is offered using the partial preference information;
    calculating, by the processor, second actual payment amounts of other target objects in the target objects except the subset of the target objects after a preference is offered using respective single item preference information;
    calculating, by the processor in a traversal manner, a total payment amount of the target objects using various combinations of the first actual payment amount and the second actual payment amounts; and
    generating, by the processor, a third payment solution,
    wherein generating the at least one payment solution according to the first payment solution and the second payment solution comprises generating the at least one payment solution according to the first payment solution, the second payment solution, and the third payment solution.

5. The method according to claim 3, wherein determining the valid preference information of the target objects comprises:
    acquiring, by the processor, information about an account in a digital wallet of a user of the digital wallet client, wherein the account comprises at least one of a credit card account, a bank card account, a very important person (VIP) card account, a bonus point account, or a coupon account;
    acquiring, by the processor, preference information corresponding to the account; and
    matching, by the processor, the preference information corresponding to the information about the account with the target objects to obtain the valid preference information of the target objects.

6. The method according to claim 1, further comprising:
    sending, by a transmitter coupled to the processor, the sales information of the target objects to a digital wallet server; and
    receiving, by the receiver, the different payment solutions returned by the digital wallet server.

7. The method according to claim 1, wherein displaying the different payment solutions comprises:
    receiving, by the receiver, a payment solution setting instruction entered by the user; and
    displaying, by the display, the different payment solutions comprising a payment solution corresponding to the payment solution setting instruction.

8. The method according to claim 1, wherein the method further comprises:
    receiving, by the receiver, a payment solution selection instruction entered by the user; and
    using, by the processor, a payment solution corresponding to the payment solution selection instruction to complete a transaction.

9. A digital wallet-based transaction method implemented by a digital wallet server, comprising:
    receiving, by a receiver of the digital wallet server, sales information of a plurality of target objects received from a digital wallet client;
    determining, by a processor coupled to the receiver, valid preference information separately for each of plurality of the target objects based on the sales information, wherein the valid preference information is a preference for using a payment solution for each of the plurality of target objects;
    determining, by the processor, a plurality of payment solutions separately for each of the plurality of target objects based on the valid preference information for each of the plurality of target objects;
    determining, by the processor, a plurality of different payment solutions based on a plurality of different permutations and combinations of the payment solutions for each of the plurality of target objects; and
    sending the different payment solutions to the digital wallet client.

10. The method according to claim 9, wherein the payment solutions for each of the target objects comprise at least one of a first payment solution with a smallest payment amount under a cash payment condition, a second payment solution with a smallest payment amount under a condition in which a credit card is preferred, a third payment solution with a smallest payment amount under a condition in which a deposit card is preferred, a fourth payment solution with a smallest payment amount under a condition in which a very important person (VIP) card is preferred, a fifth payment solution with a smallest payment amount under a condition in which a coupon is preferred, or a sixth payment solution with a smallest payment amount under a condition in which bonus points are preferred.

11. The method according to claim 9, wherein the valid preference information comprises single item preference information of each target object in the target objects and overall preference information of all target objects in the target objects, wherein the method further comprises:
    calculating, by the processor, a single-item actual payment amount after a preference is offered to each target object using the respective single item preference information;
    calculating, by the processor in a traversal manner, a total payment amount of the target objects using different combinations of the single-item actual payment amounts of the target objects;
    generating, by the processor, a first payment solution;
    calculating, by the processor, a total payment amount of the target objects after a preference is offered to all the target objects using the overall preference information;
    generating, by the processor, a second payment solution; and
    generating, by the processor, at least one payment solution according to the first payment solution and the second payment solution.

12. The method according to claim 11, wherein the valid preference information further comprises partial preference information of a subset of the target objects, and wherein the method further comprises:
    calculating, by the processor, a first actual payment amount of the subset of the target objects after the preference is offered using the partial preference information;
    calculating, by the processor, second actual payment amounts of other target objects in the target objects except the subset of the target objects after a preference is offered using respective single item preference information;
    calculating, by the processor in a traversal manner, a total payment amount of the target objects using various combinations of the first actual payment amount and the second actual payment amounts; and
    generating, by the processor, a third payment solution,
    wherein generating the at least one payment solution according to the first payment solution and the second payment solution comprises generating the at least one payment solution according to the first payment solution, the second payment solution, and the third payment solution.

13. The method according to claim 11, wherein determining the valid preference information of the target objects comprises:
    acquiring, by the processor, information about an account in a digital wallet of a user of the digital wallet client, wherein the account comprises at least one of a credit card account, a bank card account, a very important person (VIP) card account, a bonus point account, or a coupon account;
    acquiring, by the processor, preference information corresponding to the account; and
    matching, by the processor, the preference information corresponding to the information about the account with the target objects to obtain the valid preference information of the target objects.

14. A digital wallet-based transaction apparatus, wherein the apparatus comprises:
- a receiver configured to receive sales information of a plurality of target objects from a digital wallet client;
- a processor coupled to the receiver and configured to:
  - determine valid preference information separately for each of the plurality of target objects based on the sales information, wherein the valid preference information is a preference for using a payment solution for each of the target objects;
  - determine a plurality of payment solutions separately for each of the plurality of target objects based on the valid preference information for each of the plurality of target objects; and
  - determine a plurality of different payment solutions based on a plurality of different permutations and combinations of the payment solutions for each of the plurality of target objects; and
- a display coupled to the processor and configured to display the different payment solutions.

15. The apparatus according to claim 14, wherein the payment solutions for each of the target objects comprise at least one of a first payment solution with a smallest payment amount under a cash payment condition, a second payment solution with a smallest payment amount under a condition in which a credit card is preferred, a third payment solution with a smallest payment amount under a condition in which a deposit card is preferred, a fourth payment solution with a smallest payment amount under a condition in which a very important person (VIP) card is preferred, a fifth payment solution with a smallest payment amount under a condition in which a coupon is preferred, or a sixth payment solution with a smallest payment amount under a condition in which bonus points are preferred.

16. The apparatus according to claim 14, wherein the valid preference information comprises single item preference information of each target object in the target objects and overall preference information of all target objects in the target objects, and wherein the processor is further configured to:
- calculate a single-item actual payment amount after a preference is offered to each target object using the respective single item preference information;
- calculate, in a traversal manner, a total payment amount of the target objects using different combinations of the single-item actual payment amounts of the target objects;
- generate a first payment solution;
- calculate a total payment amount of the target objects after a preference is offered to all the target objects using the overall preference information;
- generate a second payment solution; and
- generate at least one payment solution according to the first payment solution and the second payment solution.

17. The apparatus according to claim 16, wherein the valid preference information further comprises partial preference information of a subset of the target objects, and wherein the processor is further configured to:
- calculate a first actual payment amount of the subset of the target objects after the preference is offered using the partial preference information;
- calculate second actual payment amounts of other target objects in the target objects except the subset of the target objects after a preference is offered using respective single item preference information;
- calculate, in a traversal manner, a total payment amount of the target objects using various combinations of the first actual payment amount and the second actual payment amounts;
- generate a third payment solution; and
- generate the at least one payment solution according to the first payment solution, the second payment solution, and the third payment solution.

18. The apparatus according to claim 16, wherein the processor is further configured to:
- acquire information about an account in a digital wallet of a user of the digital wallet client, wherein the account comprises at least one of a credit card account, a bank card account, a VIP card account, a bonus point account, or a coupon account;
- acquire preference information corresponding to the account; and
- match the preference information corresponding to the information about the account with the target objects to obtain the valid preference information of the target objects.

19. The apparatus according to claim 14, further comprising a transmitter configured to send the sales information of the target objects to a digital wallet server; and wherein the receiver is further configured to receive the different payment solutions returned by the digital wallet server.

20. The apparatus according to claim 14, wherein the processor is further configured to receive a payment solution setting instruction entered by the user, and wherein the display is further configured to display the different payment solutions comprising a payment solution corresponding to the payment solution setting instruction.

21. The apparatus according to claim 14, wherein the processor is further configured to:
- receive a payment solution selection instruction entered by the user; and
- use a payment solution corresponding to the payment solution selection instruction to complete a transaction.

22. A digital wallet-based transaction apparatus, wherein the apparatus comprises:
- a receiver configured to receive sales information of a plurality of target objects from a digital wallet client;
- a processor coupled to the receiver and configured to:
  - determine valid preference information separately for each of the plurality of target objects based on the sales information, wherein the valid preference information is a preference for using a payment solution for each of the plurality of target objects;
  - determine a plurality of payment solutions separately for each of the plurality of target objects based on the valid preference information for each of the plurality of target objects; and
  - determine a plurality of different payment solutions based on a plurality of different permutations and combinations of the payment solutions for each of the plurality of target objects; and
- a transmitter coupled to the processor and configured to send the different payment solution to the digital wallet client.

23. The apparatus according to claim 22, wherein the payment solutions for each of the target objects comprise at least one of a first payment solution with a smallest payment amount under a cash payment condition, a second payment solution with a smallest payment amount under a condition in which a credit card is preferred, a third payment solution with a smallest payment amount under a condition in which a deposit card is preferred, a fourth payment solution with a smallest payment amount under a condition in which a very important person (VIP) card is preferred, a fifth payment solution with a smallest payment amount under a condition in which a coupon is preferred, or a sixth payment solution with a smallest payment amount under a condition in which bonus points are preferred.

24. The apparatus according to claim 22, wherein the valid preference information comprises single item preference information of each target object in the target objects and overall preference information of all target objects in the target objects, and wherein the processor is further configured to:
  calculate a single-item actual payment amount after a preference is offered to each target object using the respective single item preference information;
  calculate, in a traversal manner, a total payment amount of the target objects using various combinations of the single-item actual payment amounts of the target objects,
  generate a first payment solution;
  calculate a total payment amount of the target objects after a preference is offered to all the target objects using the overall preference information,
  generate a second payment solution; and
  generate at least one payment solution according to the first payment solution and the second payment solution.

25. The apparatus according to claim 24, wherein the valid preference information further comprises partial preference information of a subset of the target objects, and wherein the processor is further configured to:
  calculate a first actual payment amount of the subset of the target objects after the preference is offered using the partial preference information;
  calculate second actual payment amounts of other target objects in the target objects except the subset of the target objects after a preference is offered using respective single item preference information;
  calculate, in a traversal manner, a total payment amount of the target objects using various combinations of the first actual payment amount and the second actual payment amounts;
  generate a third payment solution; and
  generate the at least one payment solution according to the first payment solution, the second payment solution, and the third payment solution.

26. The apparatus according to claim 24, wherein the receiver is further configured to receive information about an account in a digital wallet of a user of the digital wallet client, wherein the account comprises at least one of a credit card account, a bank card account, a very important person (VIP) card account, a bonus point account, or a coupon account, and wherein the processor is further configured to:
  acquire preference information corresponding to the account; and
  match the preference information corresponding to the information about the account with the target objects to obtain the valid preference information of the target objects.

27. A digital wallet-based transaction system, comprising:
a digital wallet server; and
a digital wallet client that is configured to:
  receive sales information of a plurality of target objects; and
  send the sales information of the plurality of target objects to the digital wallet server; and
wherein the digital wallet server is configured to:
  receive the sales information of the plurality of target objects from the digital wallet client;
  determine valid preference information separately for each of the plurality of target objects based on the sales information, wherein the valid preference information is a preference for using a payment solution for each of the target objects;
  determine a plurality of payment solutions separately for each of the plurality of target objects based on the valid preference information for each of the plurality of target objects; and
  determine one or more different payment solutions based on a plurality of different permutations and combinations of the payment solutions for each of the target objects; and
  send the different payment solutions to the digital wallet client.

* * * * *